3,743,516
PREPARATION OF CHEESE FROM
SOYBEAN MILK
Erik Lundstedt, South Chatham, Mass., and Frank Yau-Yee Lo, Kwun Tong, Hong Kong, assignors to The Hong Kong Soya Bean Products Co., Ltd., Kowloon, Hong Kong
No Drawing. Filed Dec. 1, 1970, Ser. No. 94,205
Int. Cl. A23c 19/02
U.S. Cl. 99—116                    15 Claims

ABSTRACT OF THE DISCLOSURE

A new curd from soya bean milk which is heat-stable, suitable for the preparation of a meltable cheese by the hot-pack process, is prepared by adding 1–10% of fat and 0.5–5.0% of skim milk solids to soya bean milk, pasteurizing, homogenizing, forming the curd, preferably by lactic acid bacteria, at a temperature below 120° F., heating to a temperature between 140° and 170° F., and draining until the moisture content of the curd is between 60 and 80%.

---

This invention relates to cheese and more specifically to a novel cheese curd from soya bean milk.

It is well known that soya beans have very high nutritive value and that the soya protein is rich in the essential amino-acids lysine, tryptophane and threonine. In view of the high protein content and the easy availability of soya beans, it is not surprising that many efforts have been made to utilize them for the preparation of palatable and digestible products. A cheese curd has been manufactured in China for a long time under the name Tofu. Although this product is a good source of proteins for Chinese people, it has the disadvantage that it is only stable for a short period of time, not more than seven days. Fu Yu, which is made with self-soured whey, may be kept at the most for a period of two months in a salted rice-wine solution.

Another disadvantage of the known Tofu and Fu Yu is that the curd cannot be reheated and homogenized by the more modern and commercial processes, specifically, the hot-pack method developed by Erik Lundstedt, J. Dairy Science, 37, 243 (1954). Although an elaborate discussion of this method is not necessary for an understanding of the present invention, it will be appreciated that the hot-pack process is a commercially-accepted method for packing meltable cheeses such as Neufchatel and cream cheeses, to yield a product having superior keeping qualities.

The term "meltable cheese" in the dairy industry connotes cheeses such as Neufchatel or cream cheese, that is cheeses which become softer with rise in temperature, and which upon heating, do not separate into casein, fat and whey. These cheeses are homogenized hot to maintain the smooth homogeneous body. Essentially Lundstedt's method consists of blending Neufchatel cheese with high fat cream until the proper composition is reached. The product is mixed with a stabilizer and salt, heated to 150° F., homogenized and packed hot. After cooling, the cheese has smooth body and texture, with good slicing and spreading qualities. The product keeps for six months or longer. In view of the superiority of the hot pack process, it is manifest that it is desirable to modify the properties of the curd from soya bean milk in such a manner that it can be processed by this method.

Very recently, Obara, Ohata and Tanaka, in Memories of the Fac. Agr. Tokyo, Univ. of Education, No. 16: 51–81, 1970, have described a process for the preparation of a cheese-like soya bean product. This material involves (1) addition of an agglutinant to soya bean milk to form the curd (2) concentration of the curd by removal of whey (3) addition of an enzyme with a starter and sodium chloride, (4) molding and (5) ripening. The product obtained by the action of papain is reported to be superior to the products obtained by other enzymes because of its good digestibility. The product is reported to have good nutritive value in rats but it is not a meltable cheese like Neufchatel or cream cheese, and it cannot be placed in sealed containers by the hot pack method.

Until the present invention, soya bean curd, upon heating, has become rubbery and non-coherent and it has been impossible to alter its flow characteristics to a point where it can be pumped, homogenized and packed hot into containers.

U.S.P. 3,399,997, describes a process for the preparation of a curd from soya beans which consists of soaking the beans, grinding them, adding water, extracting the milk, cooling under pressure and adding a chemical agent to precipitate the curd. No attempt, however, is made to obtain a cheese product from the curd, but the curd is comminuted and mixed with water to obtain a product resembling milk after homogenization.

The object of this invention is to provide a process for the preparation of a curd from soya bean milk which may be utilized to make a meltable, heat processed cheese.

Another object is to provide a process for the preparation of the curd from soya bean milk which requires less time than the known curd method and which is more suitable for industrial applications.

Another object is to produce a soya bean cheese suitable for hot-pack processing.

Still another object is to modify the properties of the soya bean curd so that it may be processed into a new type of cheese with superior stability.

A further object is to provide a new, heat-stable curd from soya bean milk.

Another object is to provide a new curd from soya bean milk which may be drained by a commercial curd separator.

One feature of this invention resides in the finding that by addition of fat, the basic characteristics of the soya bean milk curd are changed and the curd becomes heat-stable, meltable and suitable for homogenization. Although the present invention is not to be limited by speculative theories, it is believed that the fat added to the curd, acts as a lubricant and makes it suitable for homogenization. The amount of fat added may be varied upward from a minimum of 1% but practical considerations indicate that the amount of fat added should be between 1 and 10%, when the soya bean milk has about a 6% solid content. The fat may be any edible vegetable or animal fat.

Another feature of this invention resides in the fact that superior results are achieved by the incorporation of skim milk or skim milk solids in conjunction with the fat in soya bean milk.

Soya bean milk is well known and although its preparation is not part of this invention, a brief review of the method used here will be advantageous for a full understanding of the invention. The soya beans used are the yellow varieties which have a weight of 16–18 grams per 100 seeds. After washing with a sufficient volume of cold water, a soaking step is carried out for a period of about four hours depending upon the temperature of the water. Soaking is allowed to continue until water is absorbed, the volume reached is about twice the volume of the dry beans, and the moisture content is about 60%. The volume of water used is about ten times the volume of the beans.

The soaked and drained beans are then ground, for instance, in a stone mill or burr mill, with additional water, in the ratio of about 1:5. The ground material is then filtered through a filter press or a cloth lined basket centrifuge or passed through a sludge separator, and a liquid product is obtained, which contains between 1 and 10% solids. If the soya beans on a dry basis contain 40 percent protein it is possible to recover 70 percent of the protein and about 65 percent of the total solids of the beans in the form of colloidal, suspended and soluble milk solids free of any perceptible sediment. This soya bean milk with a solid content between 1 and 10%, is a satisfactory starting material for the preparation of the heat-stable meltable curd but, for all practical purposes, it is preferably to use a milk with about 6% solids.

The soya bean milk described in the preceding paragraphs is the conventional starting material for the preparation of Tofu. According to well known methods, the milk is heated to boiling, cooled to between 130° and 160° F. and coagulated with a variety of reagents, such as Plaster of Paris or a saturated solution of calcium chloride or acids. Contrary to some literature reports, rennet has no effect in coagulating soya bean milk.

The process for the preparation of the meltable, heat-stable curd from soya bean milk according to the present invention comprises preparing soya bean milk of solid content between 1 and 10%, adding an edible fat in amount of at least 1% by weight, and preferably, skim milk solids in amount between 0.5 and 5%, pasteurizing at a temperature of about 185°–200° F., homogenizing, cooling to 75°–100° F., adding a coagulant, to induce curd formation at a temperature below 120° F., heating to about 140°–170° F., hot-packing by heating to at least about 150° F., homogenizing, pumping and packaging hot.

The method used according to the present invention for the preparation of the heat-stable, melting curd, differs from the preparation of Tofu. After addition of a fat, in the portion of 1–10%, the milk is heated, preferably to 200° F. with live steam for 10 minutes and homogenized at 2500 lbs. pressure.

It is then cooled to about 75° F. and treated with a coagulating agent, for instance 0.3% anhydrous calcium chloride or its equivalent in the form of a 10% aqueous solution. The calcium chloride is added under strong agitation, the mixture is heated slowly to about 160° F. and the coagulated milk allowed to stand until the curd particles gather to form particles of sufficiently large size. The mix is then cooled and for the drainage, nylon bags are advantageously used at a temperature between 40° and 60° F. Drainage is slower at low temperature, but low temperature gives a superior and smooth, silky curd. Although many variations may be made in the temperature, the type of bags and the time involved, it is advantageous to drain the bags for about two hours in a cheese vat and then transfer them to a room kept at 50° F. or lower where the bags are hung on racks. A moisture content of about 75%, is achieved after draining for about 14–18 hours.

The curd prepared as described hereinabove is not entirely satisfactory because if it is allowed to stand in the heating kettle too long, it undergoes hydration. In accordance with the preferred embodiment of this invention, a small amount of skim milk or skim milk solids is added to the soya bean milk containing fat. The amount of skim milk solids may vary between 0.5 to 5 percent and is preferably about 1.5% when the fat content is 2%. The beneficial effect of the skim milk solids is probably due to the fact that the casein and the proteins present in the soya bean milk precipitate together in a finely dispersed suspension which ultimately after drainage produce a meltable curd. In accordance with this embodiment, the soya bean milk containing, for instance, 6% solids, 2% fat and 1.5% of skim milk solids, is heated to about 200° F. for ten minutes, homogenized cooled to about 75° F. and treated with the coagulating agent.

Many coagulating agents may be used within the scope of this invention. In addition to calcium chloride, organic or inorganic acids may be used. Lactic acid forming bacteria are to be preferred. A butter culture consisting of 15% *Streptococcus diacetilactis*, 8% *Leuconostoc citrovorum* and the balance *Streptococcus cremoris* is satisfactory. This culture may be added in the amount of about 0.5% to the soya bean milk fortified with fat and skim milk as described hereinabove. At a temperature between 70° F. and 80° F., for a period of time of 15–18 hours, a solid curd is formed at a pH of 4.0–4.5, usually 4.3–4.4. The curd is then heated under vigorous agitation to a temperature of 160° F. or to a point where the curd becomes drainable. By this process, the curd is obtained in a very finely divided form. After cooling to below 85° F. the mix is standardized to a pH of 4.8 with about 0.1 percent sodium bicarbonate. The curd is placed in bags and separated from the liquid. The curd may also be drained by means of a commercial curd separator.

When calcium chloride is used as the coagulating agent, the pH of the curd is about 5.3.

The curd so obtained is smooth, of fine texture, heat-stable and suitable for the preparation of cheese by the hot-pack process. The curd is suitable for the incorporation of other flavors, for instance other cheeses, or fruit, or condiments.

For the purpose of better illustrating the invention, the following example is described in detail.

EXAMPLE 1

One hundred pounds of soya beans were washed and soaked in about 1,000 lbs. of water at a temperature of 72–75° F. for about four hours, ground and then filtered or centrifuged to give soya bean milk. The total recovery of solids from the beans, which contained 89% of solids, after cooling and centrifuging, was 65%. The total amount of soya bean milk was 965 pounds, containing 57.9 pounds of soya bean solids.

Butterfat, in the amount of 19.3 pounds and skim milk solids in the amount of 14.5 pounds, were added and the material was heated to 200° F. for about ten minutes. The material was then cooled to 75° F., inoculated with a starter consisting of 15% *Streptococcus diacetilactis*, 8% *Leuconostoc citrovorum*, the balance being *Streptococcus cremoris*, in the amount of 0.5%. On standing overnight at about 75° F., the pH dropped to 4.3–4.4 and a solid, highly aromatic curd was formed. The milk was heated under agitation to 160° F. cooled to 85° F. and 0.1% sodium bicarbonate was added to obtain a pH of 4.8. The curd was obtained in a finely dispersed form, and was drained by means of nylon bags, which were left in a cooler overnight. This curd was suitable for the preparation of cheese by the hot-pack process, and contained 75 percent moisture.

After formation of the curd, it is found that the recovery of the soya bean solids is 37.6 pounds, corresponding to 65% of the soya bean milk solids. The recovery of the fat used is 18.9 pounds, corresponding to 98% of the 19.3 pounds of fat used. The recovery of the non-fat milk solids is 38% of the 14.5 pounds used, that is 5.4 pound. Thus the total amount of cheese solids is 61.9 pounds. In view of the fact that the cheese contains 75% moisture, this corresponds to $$\frac{61.9 \times 100}{25} = 248 \text{ pounds of cheese}$$

Thus the recovery of the cheese solids is very high.

The data given above are summarized in the table below:

RECOVERY OF MILK SOLIDS FROM THE ORIGINAL SOYA BEAN SOLIDS

| Ingredients | Pounds | Percent, T.S. | Pounds, T.S. | Recovery, percent | Pounds |
|---|---|---|---|---|---|
| Soya beans | 100 | 89 | 89.0 | 100 | 89.0 |
| Soaked beans | 211.5 | 40 | 84.6 | 95 | 84.6 |
| Soya bean milk | 965 | 6 | 57.9 | 65 | 57.9 |

RECOVERY OF CHEESE SOLIDS FROM SOYA BEAN MILK' FAT AND M.S.N.F. CHEESE SOLIDS

| Ingredients | Pounds | Percent, T.S. | Pounds, T.S. | Recovery, percent | Pounds |
|---|---|---|---|---|---|
| Soya bean milk | 965 | 6 | 57.9 | 65 | 37.6 |
| Fat: ⅓ of milk solids | 19.3 | 100 | 19.3 | 98 | 18.9 |
| M.S.N.F.: ¼ of milk solids | 14.5 | 97 | 14.1 | 38 | 5.4 |
| Total | | | | | 61.9 |

It should be observed that the addition of 2 percent fat to a soya bean milk containing 6 percent of total solids amounts to addition of fat in the amount of one third of the total solids. Similarly the addition of 1.5 percent of non-fat milk solids amounts to addition of non-fat in the total in the amount of one quarter of the total solid in the soya bean milk. This ratio should preferably be observed.

The product consists of about 75% water, about 7.6% of butterfat, about 15.16% of soya bean solids and about 2.18% of non-fat milk solids.

EXAMPLE 2

The following is an example of a food product comprising the soya bean curd of this invention.

Fu Yu soya cheese spread

The following ingredients are used:

| | Lbs. |
|---|---|
| Soya bean base curd (the added fat in the soya bean milk was fat from hydrogenated coconut oil of M.P. 96° F.) | 1000.0 |
| Well ripened Fu Yu cheese | 300.0 |
| Locust bean gum | 5.0 |
| Mono sodium glutamate | 5.0 |
| Annatto cheese color | 5.0 |
| Cane sugar | 20.0 |
| Potassium sorbate | 1.5 |

This composition exhibits:

| | |
|---|---|
| pH | 4.9 to 5.0 |
| Moisture percent | 71 |
| Fat do | 14 |
| Protein do | 12 |
| Sugars do | 1.5 |
| Calories per 100 grams | 180 |

The ingredients are mixed cold in the cheese kettle and the mass is slowly heated, without steam pressure in the jacket, to a temperature of 175° F. The free flowing-meltable cheese is then homogenized at 2500 lbs. pressure and pumped to the filling machine. The hot cheese is then metered into 5-oz. glass jars and vacuum sealed with metal caps.

We claim:

1. A meltable heat-stable cheese curd consisting of about 75% of water, about 7.6% of an added edible fat, about 15.16% of soya bean solids and about 2.18% of non-fat milk solids.

2. A meltable heat-stable curd according to claim 1 wherein said added edible fat is hydrogenated coconut oil or butterfat.

3. The curd according to claim 1 wherein the added fat is butterfat.

4. A meltable cheese prepared from the curd of claim 1.

5. A food product comprising the curd of claim 1.

6. The process of preparing a meltable, heat-stable curd from soya bean milk which comprises (1) preparing soya bean milk of solid content between 1 and 10%, (2) adding an edible fat in amount of at least 1% by weight, and skim milk solids in the amount of 0.5–5% by weight, (3) pasteurizing at a temperature of about 185°–200° F., (4) homogenizing, (5) cooling and (6) adding a coagulant to induce curd formation, (7) heating to about 140°–170° F., (8) cooling (9) draining the curd until the moisture content is 60–80% (10) heating said drained curd to a temperature of at least about 150° F. to form a melted flowing curd, (11) homogenizing said melted curd and packaging while hot.

7. The process according to claim 6 wherein pasteurization is carried out at 185° F. for 20 minutes.

8. The process according to claim 6, wherein at least another cheese or condiment or fruit or vegetable is added to said soya bean curd and a heat stable cheese product is obtained.

9. The process according to claim 6 wherein pasteurization is carried out at 200° F. for about 10 minutes.

10. The process according to claim 6, wherein the soya bean milk contains between 1 and 10% of added fat, pasteurization is carried out at 200° F. for ten minutes and the cooling in step (8) is carried out to a temperature below 85° F.

11. The process according to claim 10 wherein the added fat content is 2% and the skim milk solids are in amount of 1.5%.

12. The process according to claim 10 wherein the milk has 6% solid content and is cooled to 75°–100° F. before adding the coagulant.

13. The process according to claim 10 wherein the coagulant is calcium chloride or lactic acid or lactic acid bacteria.

14. The process according to claim 10 wherein the coagulant is a butter culture or cheese culture.

15. The process according to claim 10 wherein curd formation is carried out below a temperature of 120° F.

References Cited

UNITED STATES PATENTS

| | | | |
|---|---|---|---|
| 3,642,493 | 2/1972 | Atrdt | 99—64 |
| 3,297,451 | 1/1967 | Eggen et al. | 99—116 |
| 3,117,870 | 1/1964 | Hussong et al. | 99—116 |
| 3,189,464 | 6/1965 | Heinemann | 99—116 |
| 1,082,118 | 12/1913 | Gossel | 99—64 |

FOREIGN PATENTS

| | | | |
|---|---|---|---|
| 30,275 | 1910 | Great Britain | 99—64 |
| 402,948 | 1933 | Great Britain | 99—64 |

OTHER REFERENCES

Hang et al.: Preparation of Soybean Cheese Using Lactic Starter Organisms. Food Technology, vol. 21, July 1967 (pp. 1033–1038).

DAVID M. NAFF, Primary Examiner

U.S. Cl. X.R.

99—64, 115, 117